United States Patent
Fujii (10) Patent No.: US 8,532,559 B2
(45) Date of Patent: Sep. 10, 2013

(54) PRINT SYSTEM, PRINT CONTROL APPARATUS AND COMPUTER READABLE MEDIUM STORING PROGRAM

(75) Inventor: Daisuke Fujii, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 602 days.

(21) Appl. No.: 12/857,041

(22) Filed: Aug. 16, 2010

(65) Prior Publication Data

US 2011/0218671 A1 Sep. 8, 2011

(30) Foreign Application Priority Data

Mar. 2, 2010 (JP) ................................ 2010-044953

(51) Int. Cl.
- G03G 15/00 (2006.01)
- G03G 21/00 (2006.01)
- B41J 29/38 (2006.01)

(52) U.S. Cl.
USPC ........................................ 399/384; 242/534.2

(58) Field of Classification Search
USPC ......... 399/384, 389, 397, 401, 405; 400/614, 400/149, 583, 583.3, 611, 613; 101/171.178, 101/180, 219, 220, 221, 222; 242/534, 534.2; 226/2, 137, 139, 141, DIG. 46
IPC ................................................ B41J 3/42, 11/46
See application file for complete search history.

(56) References Cited

U.S. PATENT DOCUMENTS

| | | | |
|---|---|---|---|
| 5,548,390 A | | 8/1996 | Sugisaki et al. |
| 6,795,683 B2 * | | 9/2004 | Nakazawa et al. ............ 399/384 |
| 8,091,476 B2 * | | 1/2012 | Nakazawa et al. ............ 101/232 |
| 2001/0011508 A1 * | | 8/2001 | Theuner ........................ 101/228 |
| 2005/0024411 A1 * | | 2/2005 | Takenouchi et al. ............ 347/16 |

FOREIGN PATENT DOCUMENTS

| JP | 7-237336 A | 9/1995 |
|---|---|---|
| JP | 11-314421 A | 11/1999 |
| JP | 2006-153999 A | 6/2006 |
| JP | 2006153999 | * 6/2006 |

* cited by examiner

*Primary Examiner* — Matthew G Marini
*Assistant Examiner* — Ruben Parco, Jr.
(74) *Attorney, Agent, or Firm* — Sughrue Mion, PLLC (57) ABSTRACT

A print system includes: a first printer that performs printing on continuous-form paper; a second printer that performs printing on the continuous-form paper printed by the first printer; a measuring unit that measures a paper length between the first printer and the second printer; a calculator that calculates a post-conveyance amount as a distance to convey the continuous-form paper after the printing, for the first printer or the second printer, based on the paper length measured by the measuring unit; and a conveyance operation controller that controls post-conveyance operations in the first printer and the second printer based on the post-conveyance amount calculated by the calculator.

6 Claims, 10 Drawing Sheets

PRINT SYSTEM, PRINT CONTROL APPARATUS AND COMPUTER READABLE MEDIUM STORING PROGRAM

CROSS-REFERENCE TO RELATED APPLICATIONS

This application is based on and claims priority under 35 USC 119 from Japanese Patent Application No. 2010-044953 filed Mar. 2, 2010.

BACKGROUND

Technical Field

The present invention relates to a print system, a print control apparatus and a computer readable medium storing a program.

SUMMARY

According to an aspect of the invention, there is provided a print system including: a first printer that performs printing on continuous-form paper; a second printer that performs printing on the continuous-form paper printed by the first printer; a measuring unit that measures a paper length between the first printer and the second printer; a calculator that calculates a post-conveyance amount as a distance to convey the continuous-form paper after the printing, for the first printer or the second printer, based on the paper length measured by the measuring unit; and a conveyance operation controller that controls post-conveyance operations in the first printer and the second printer based on the post-conveyance amount calculated by the calculator.

BRIEF DESCRIPTION OF THE DRAWINGS

An exemplary embodiment of the present invention will be described in detail based on the following figures, wherein.

DETAILED DESCRIPTION

Figure 1:
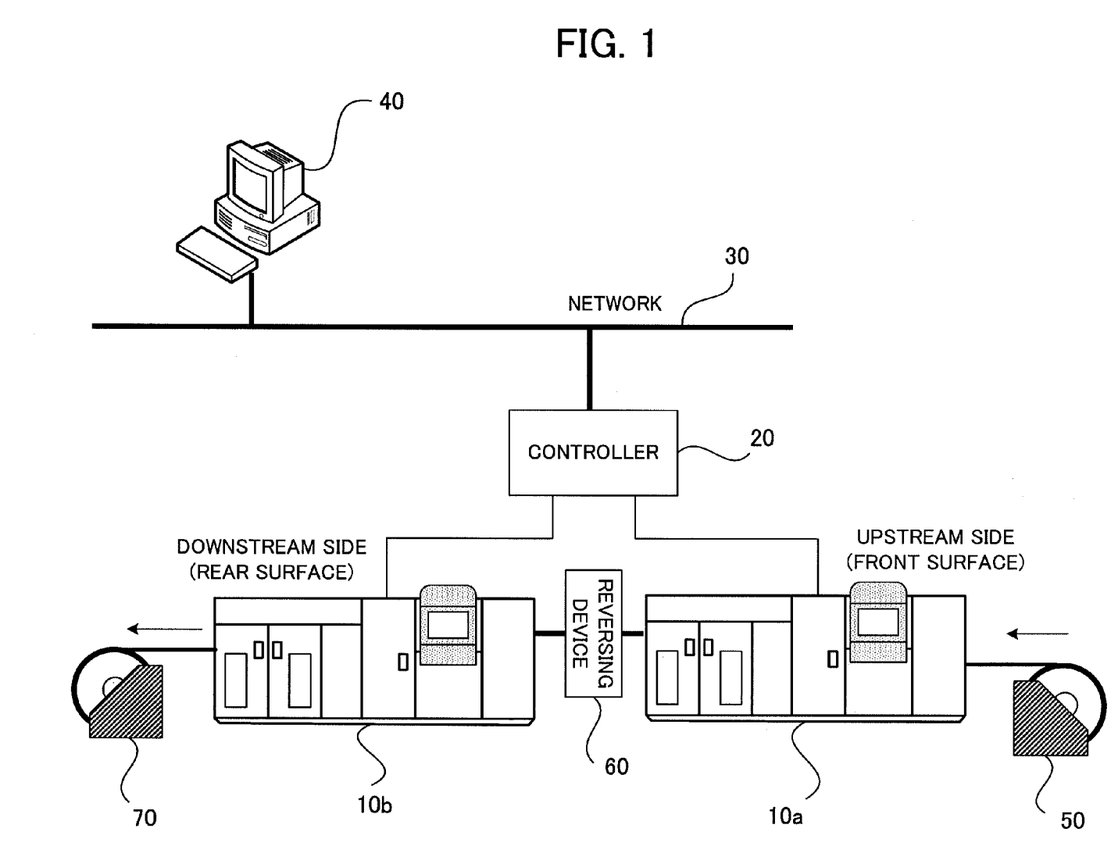
FIG. 1 illustrates a system configuration of a print system according to an exemplary embodiment of the present invention.

As shown in FIG. 1, a print system according to an exemplary embodiment of the present invention has a printers 10a and 10b, a controller (print control apparatus) 20, a terminal device 40, a preprocessing device 50, a reversing device 60 and a postprocessing device 70. The controller 20 is connected to the printers 10a and 10b so as to control the operations of the printers 10a and 10b. The terminal device 40 and the controller 20 are interconnected via a network 30.

The print system according to the present exemplary embodiment is an overlapped-continuous print system in which the printer 10a to perform print processing on a front surface of continuous-form paper and the printer 10b to perform print processing on a rear surface of the continuous-form paper printed by the printer 10a are interconnected as an overlapped-continuous print structure, thereby print processing is performed on the front and rear surfaces of the continuous-form paper.

In the present exemplary embodiment, printing is first performed on the front surface of continuous-form paper and then printing is performed on the rear surface of the continuous-form paper, accordingly, the printer 10a is referred to as an upstream side printing apparatus while the printer 10b is referred to as a downstream side printing apparatus.

The terminal device 40 generates a print job (print command), and transmits the generated print job via the network 30 to the controller 20. The controller 20 generates print data based on the print job transmitted from the terminal device 40, and controls the printers 10a and 10b to perform print processing on the continuous-form paper.

Figure 2:
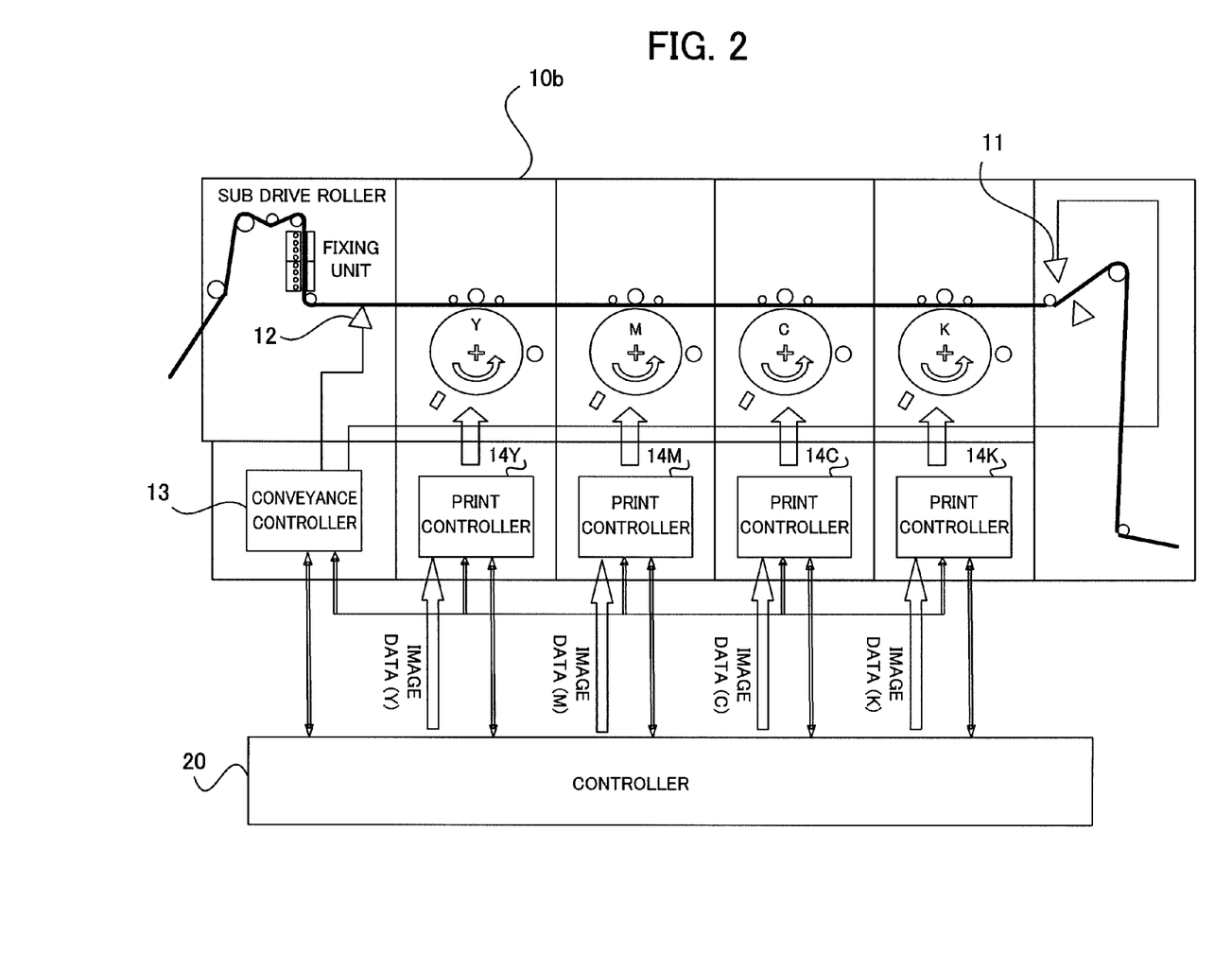
FIG. 2 illustrates a configuration of a printer 10b in the print system according to the exemplary embodiment of the present invention.

Next, the configuration of the printers 10a and 10b will be described. Note that as the printers 10a and 10b have basically the same configuration, the configuration of the printer 10b will be described here.

As shown in FIG. 2, the printer 10b has a page position detector 11 and a color position detector 12 provided on a conveyance path for continuous-form paper, a conveyance controller 13, and print controllers 14Y to 14K provided for respective YMCK colors.

The page position detector 11 detects an ROF (Registration Of Form) mark provided for paper positioning, a head position detection mark and the like. The details of the ROF mark and the head position detection mark will be described later. The color position detector 12 detects marks for positioning of print positions of respective color plates.

Since the page position detector 11 is provided, by measuring the length of the paper conveyed since the head position detection mark is printed on the continuous-form paper in the upstream side printer 10a until the head position detection mark is detected in the downstream side printer 10b, the paper length between the printer 10a and the printer 10b can be measured.

The conveyance controller 13 performs control such as driving of a driving roller for the printer 10b based on an instruction from the controller 20. The print controllers 14Y to 14K perform control to generate image data for respective YMCK colors on the continuous-form paper based on an instruction from the controller 20.

Figure 3:
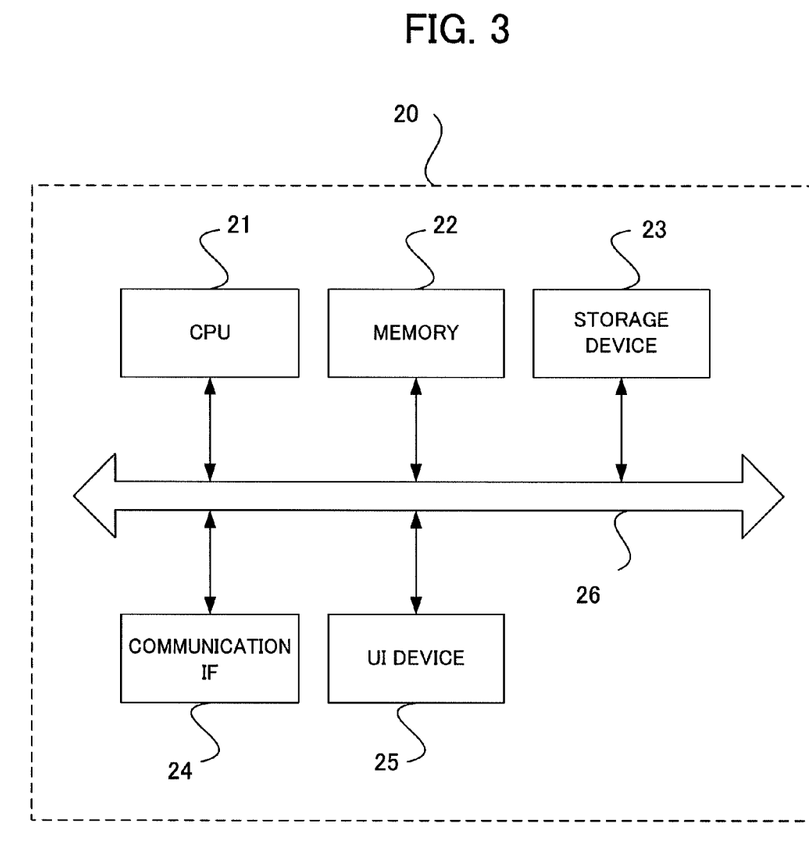
FIG. 3 is a block diagram showing a hardware configuration of a print system 10 in the exemplary embodiment of the present invention.

Next, FIG. 3 shows a hardware configuration of the controller 20 in the print system according to the present exemplary embodiment.

As shown in FIG. 3, the controller 20 has a CPU 21, a memory 22, a storage device 23 such as a hard disk drive (HDD), a communication interface (IF) 24 to perform data transmission/reception to/from the terminal device 40 and the like via the network 30, and a user interface (UI) device 25 including a touch panel or a liquid crystal display and a keyboard. These constituent elements are interconnected via a control bus 26.

The CPU 21 performs predetermined processing based on a control program stored in the memory 22 or the storage device 23 to control the operation of the controller 20. Note that in the present exemplary embodiment, the CPU 21 reads the control program stored in the memory 22 or the storage device 23 and executes the program; however, it may be arranged such that the program is stored on a storage medium such as a CD-ROM and provided to the CPU 21.

Figure 4:
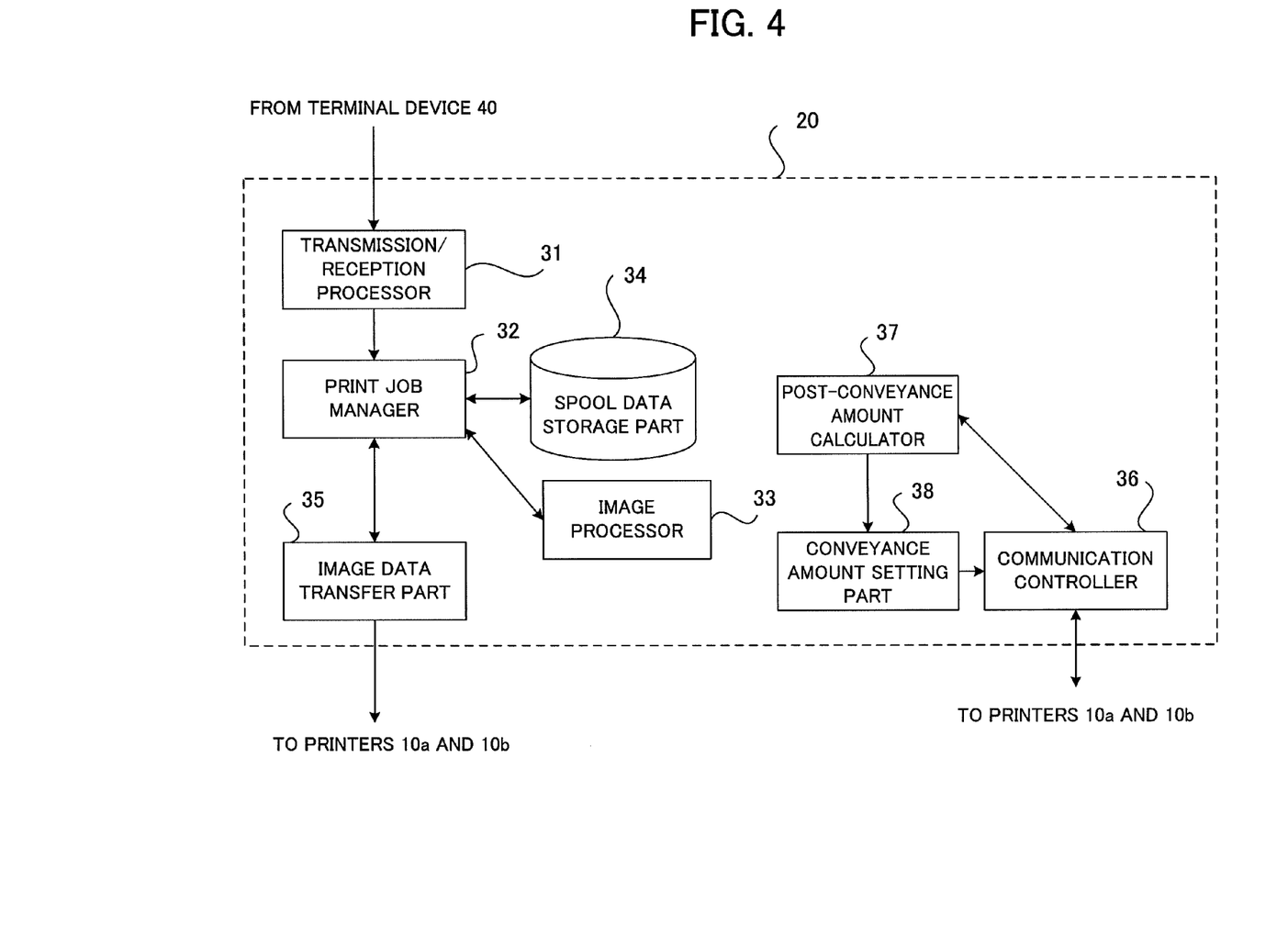
FIG. 4 is a block diagram showing a functional configuration of the print system 10 in the exemplary embodiment of the present invention.

FIG. 4 is a block diagram showing a functional configuration of the controller 20 realized by execution of the above-described control program.

As shown in FIG. 4, the controller 20 according to the present exemplary embodiment has a transmission/reception processor 31, a print job manager 32, an image processor 33, a spool data storage part 34, an image data transfer part 35, a communication controller 36, a post-conveyance amount calculator 37, and a conveyance amount setting part 38.

The transmission/reception processor 31 receives a print job from the terminal device 40, and transmits device information on the printers 10a and 10b and the like to the terminal device 40.

The print job manager 32 manages the print job received by the transmission/reception processor 31, and performs processing to transfer the received print job to the image processor 33 and store print data generated by the image processor 33 into the spool data storage part 34.

The image processor 33 performs drawing processing based on the print job thereby to generate print-processable print data in the printers 10a and 10b, e.g. for respective YMCK colors.

The image data transfer part 35 transfers the print data for respective YMCK colors transferred from the print job manager 32 to the printers 10a and 10b.

The communication controller 36 controls communication with the printers 10a and 10b. The communication controller 36 transmits instructions and information on setting contents to the respective printers 10a and 10b, and receives information such as states of the respective printers 10a and 10b.

The post-conveyance amount calculator 37 calculates a post-conveyance amount as a distance to convey the continuous-form paper after the completion of printing, based on a measured paper length between the printer 10a and the printer 10b, for the printers 10a and 10b. The conveyance amount setting part 38 sets the post-conveyance amounts calculated by the post-conveyance amount calculator 37 for the printers 10a and 10b. The conveyance amount setting part 38 and the conveyance controller 13 in the respective printers 10a and 10b form a conveyance operation controller that controls a conveyance operation.

Note that the post-conveyance processing is processing to convey continuous-form paper in a blank state so as to bring continuous-form paper on which an image has been printed to a downstream side device after the completion of printing. The post-conveyance amount is basically determined based on the paper path length (paper length) between the respective devices set in accordance with arrangement of the printers 10a and 10b and the postprocessing device 70.

Figure 5:
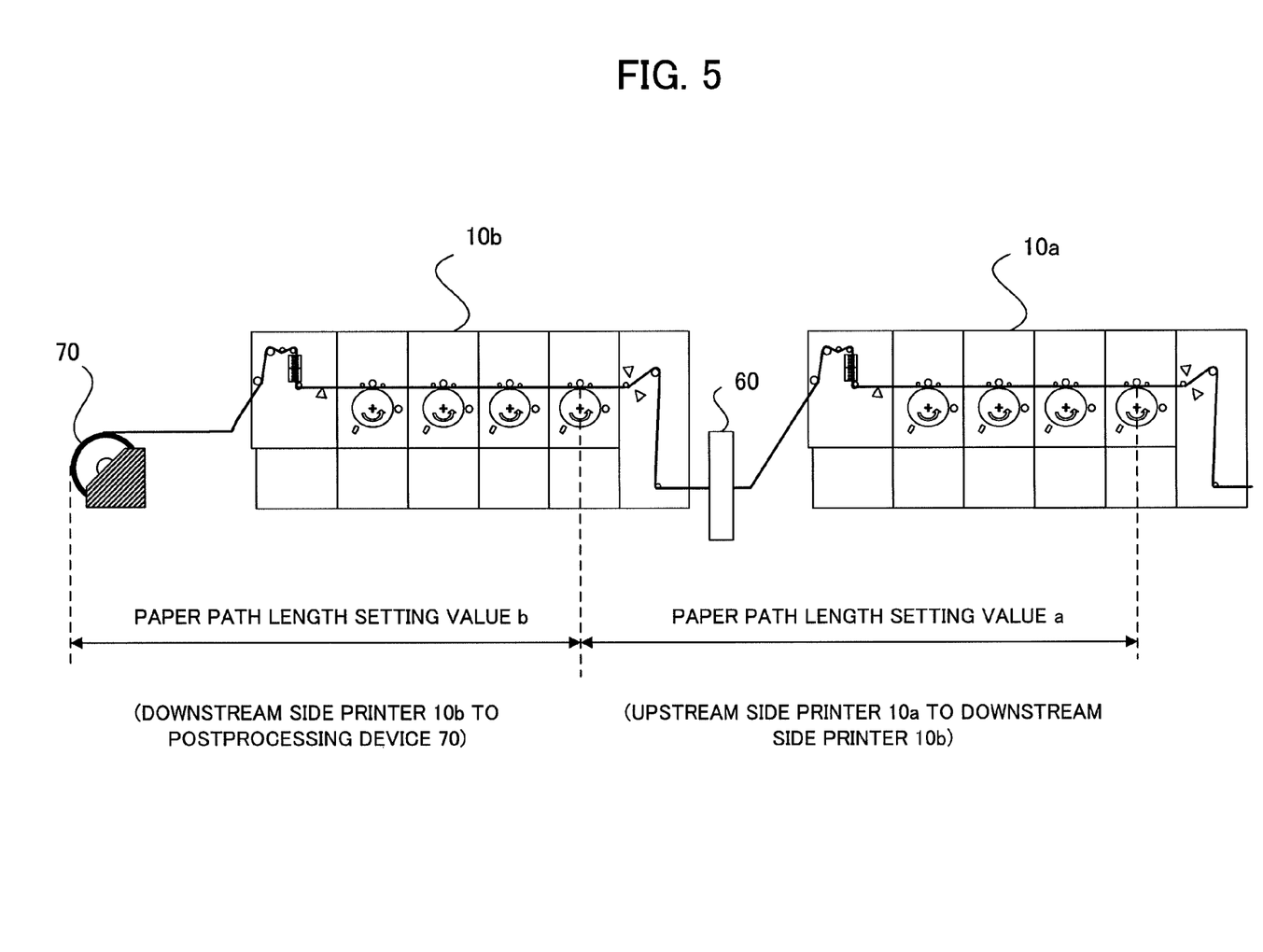
FIG. 5 is an explanatory diagram of setting of a paper path length between devices.

For example, as shown in FIG. 5, the path length between the reference position of the printer 10a and the reference position of the printer 10b is set as a paper path length setting value a. Then the path length between the reference position of the printer 10b and the reference position of the postprocessing device 70 is set as a paper path length setting value b. In this case, assuming that the post-conveyance amount regarding the upstream side printer 10a is represented as a+b and the post-conveyance amount regarding the downstream side printer 10b is represented as b, a paper path length after the completion of printing between the upstream side printer 10a and the downstream side printer 10b is set as a path length a.

Note that the optimum paper path length between the upstream side printer 10a and the downstream side printer 10b changes in accordance with paper type, device positions, the presence/absence of an intermediate paper buffer to adjust the laxation amount of the continuous-form paper by applying predetermined tension to the continuous-form paper. Therefore, when the paper path length after the completion of printing between the upstream side printer 10a and the downstream side printer 10b is to be another value than the previously-set paper path length setting value a, the optimum paper path length changes. Note that it is possible to perform printing without the intermediate paper buffer by adjusting the paper path length upstream side printer 10a and the downstream side printer 10b.

Next, the operation of the print system according to the present exemplary embodiment will be described in detail with reference to the drawings.

Figure 6:
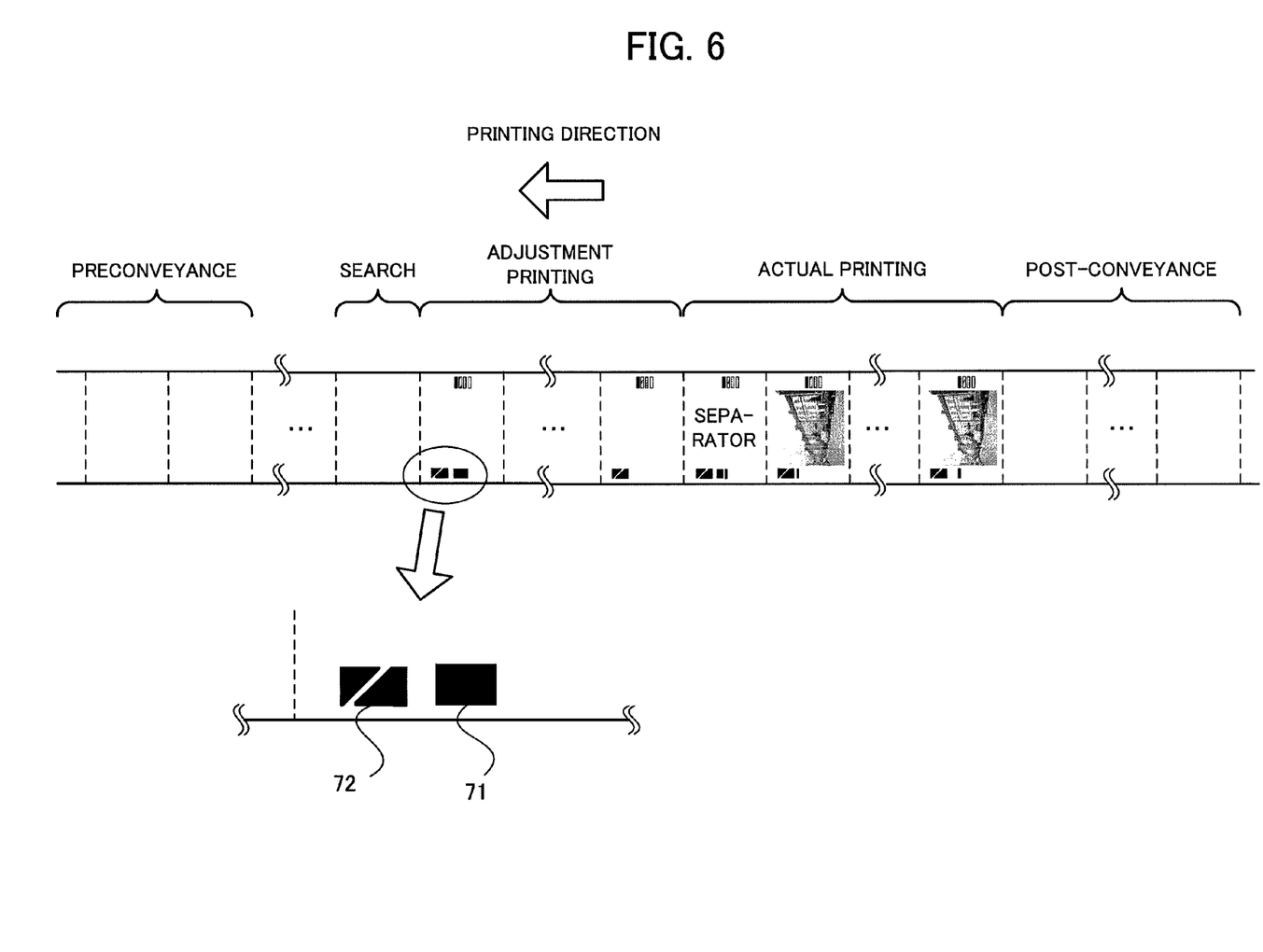
FIG. 6 illustrates an example of continuous-form paper on which printing has been performed in the print system according to the exemplary embodiment of the present invention.

First, FIG. 6 illustrates an example of continuous-form paper on which printing has been performed in the print system according to the present exemplary embodiment.

In the print system according to the present exemplary embodiment, first, preconveyance is performed to convey continuous-form paper in a predetermined length, then adjustment printing is performed, and then actual print processing is performed to print an actual image. When the actual print processing has been completed, post-conveyance respectively set in the respective printers 10a and 10b is performed.

As shown in FIG. 6, when the adjustment printing and the actual printing are performed, the ROF mark 72 is printed in a predetermined position of each page. Further, in a head page when the adjustment printing is started, the head position detection mark 71 indicating that the page is a head page is printed. The head position detection mark 71 and the ROF mark 72 are printed by the upstream side printer 10a, and detected by the page position detector 11 of the downstream side printer 10b.

Further, in a page where the adjustment printing and the actual printing are performed, a mark for positioning of respective color plates is also printed and is detected by the color position detector 12, thereby control to prevent occurrence of shift among the respective color plates is performed.

Figure 7:
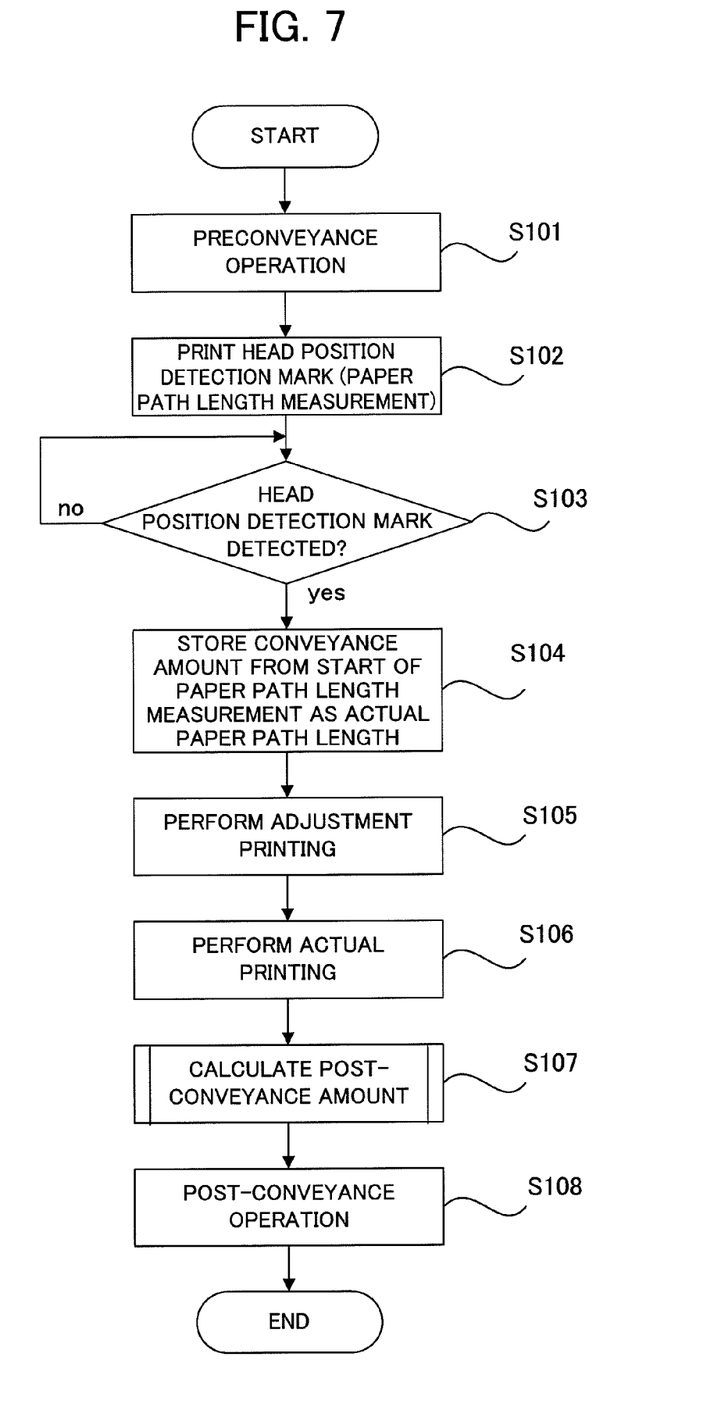
FIG. 7 is a flowchart showing an operation of the print system according to the exemplary embodiment of the present invention.
Figure 8:
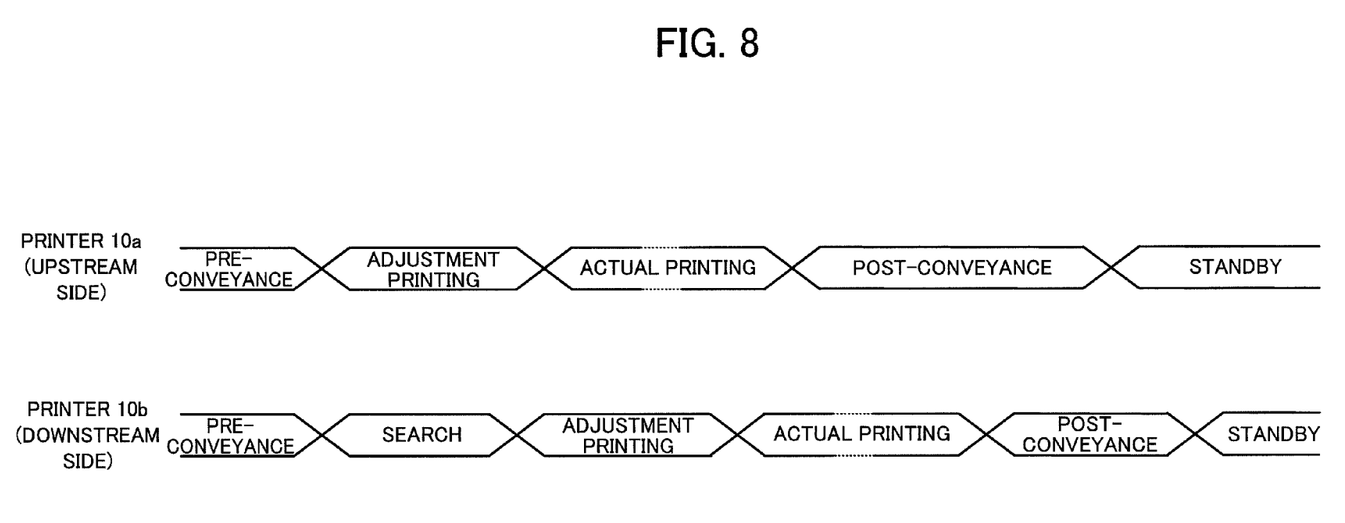
FIG. 8 illustrates operation changeover timing in the printers 10a and 10b.

Next, the operation of the print system according to the present exemplary embodiment will be described with reference to the flowchart of FIG. 7. Note that FIG. 8 shows operation changeover timings in the printers 10a and 10b.

First, the conveyance amount setting part 38 of the controller 20 sets preconveyance amounts for the printers 10a and 10b, and in the respective printers 10a and 10b, preconveyance is performed by the same length (step S101).

Then, in the upstream side printer 10a, the head position detection mark 71 is printed, and measurement of the paper path length is started (step S102). In the downstream side printer 10b, when the head position detection mark 71 is detected by the page position detector 11 (step S103), the conveyance controller 13 is notified of the detection of the head position detection mark. The conveyance controller 13 measures a current paper path length between the printer 10a and the printer 10b from the length (distance) of the continuous-form paper conveyed from an instruction of the start of adjustment printing to the detection of the head position detection mark 71. Note that it may be arranged such that the controller 20 is notified of detection of the head position detection mark 71 and the paper length measurement is performed in the controller 20.

Then, the measured paper path length is stored as an actual paper path length (step S104).

Next, the controller 20 instructs the printers 10a and 10b to perform adjustment printing (step S105). In the adjustment printing, printing is performed on e.g. blank paper for 100 pages. Then, the downstream side printer 10b detects the ROF mark 72 printed by the upstream printer 10a, and performs writing position correction, speed correction and the like.

Next, the controller 20 instructs the printers 10a and 10b to perform actual printing (step S106). In the actual printing, the upstream side printer 10a prints ID information, which differs by page, on each page, and the downstream side printer 10b reads the ID information by page and notifies the controller 20 of the read ID information. Note that during the actual printing, the downstream side printer 10b performs the writing position correction, the speed correction and the like based on the ROF mark 72.

Then, when the actual printing has been completed, the post-conveyance amount calculator 37 of the controller 20 calculates post-conveyance amounts for the printers 10a and 10b (step S107) based on the actual paper path length stored at step S104.

Then the conveyance amount setting part 38 sets the post-conveyance amounts calculated by the post-conveyance amount calculator 37 for the printers 10a and 10b, so as to perform post-conveyance operations (step S108).

Figure 9:
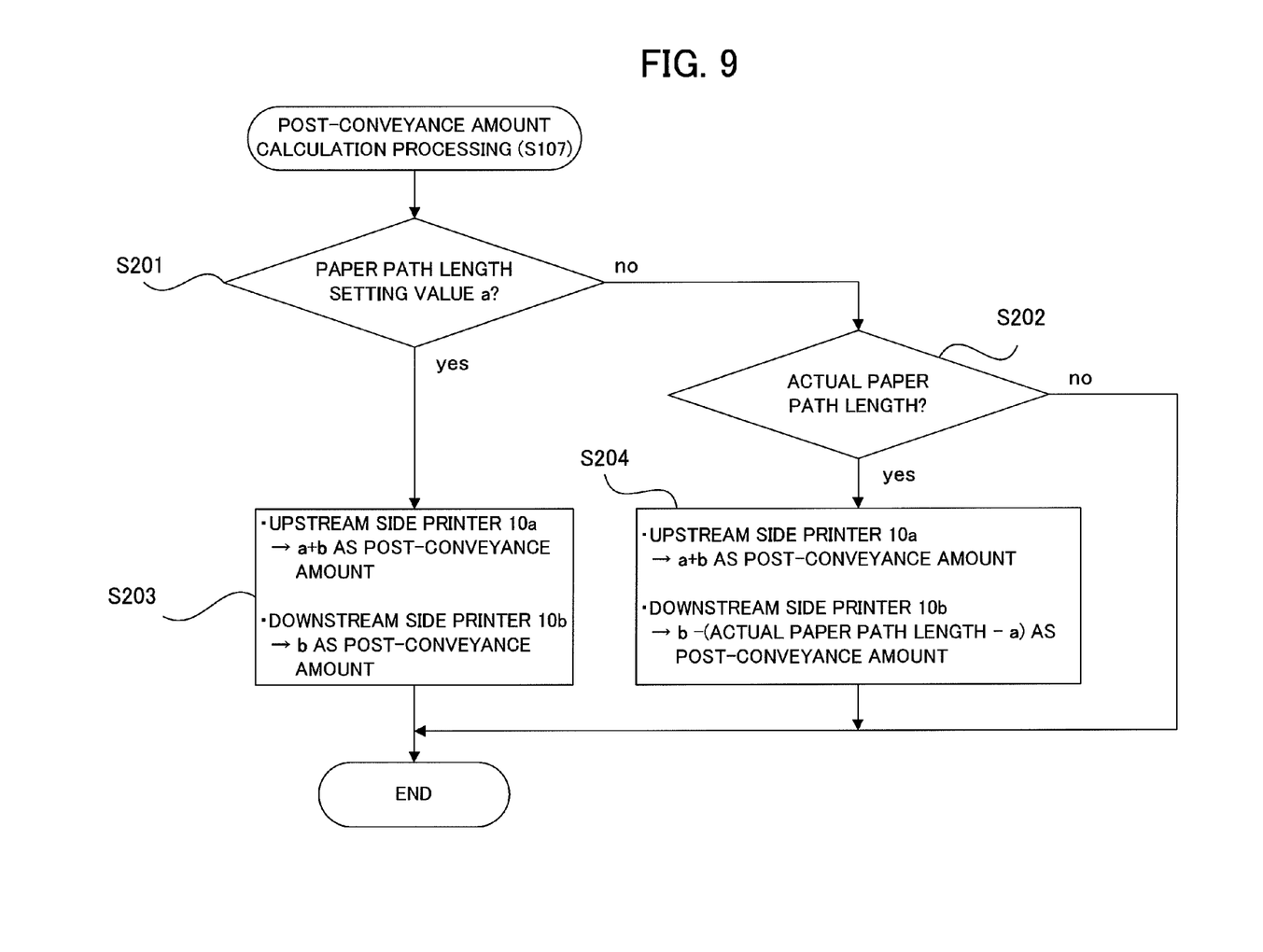
FIG. 9 is a flowchart showing the details of post-conveyance amount calculation processing at step S107 in FIG. 7.

Next, the post-conveyance amount calculation processing at step S107 in FIG. 7 will be described in more detail with reference to the flowchart of FIG. 9.

In the post-conveyance amount calculation processing, the processing differs as to whether the paper path length between the printer 10a and the printer 10b is set to the previously-set paper path length setting value a or the actual paper length which is a current actual paper path length (steps S201 and S202).

When the paper path length between the printer 10a and the printer 10b is set to the previously-set paper path length setting value a (yes at step S201), the post-conveyance amount calculator 37 obtains the sum of the previously-set paper path length setting value a and the previously-set paper path length setting value b (a+b) as the post-conveyance amount for the upstream side printer 10a. Then, the post-conveyance amount calculator 37 obtains the previously-set paper path length setting value b as the post-conveyance amount for the downstream side printer 10b (step S203).

Further, when the paper path length between the printer 10a and the printer 10b is set to the actual paper path length, i.e., when it is instructed to maintain the current paper path length as the paper path length between the printer 10a and the printer 10b (yes at step S202), the post-conveyance amount calculator 37 obtains a length by subtracting the difference between the measured actual paper path length and the paper path length setting value a from the paper path length setting value b as the post-conveyance amount for the downstream side printer 10b (step S204).

More particularly, the post-conveyance amount calculator 37 sets the post-conveyance amount for the downstream side printer 10b to paper path length setting value b−(actual paper path length−paper path length setting value a). Note that the post-conveyance amount for the upstream side printer 10a is the sum of the previously-set paper path length setting value a and the previously-set paper path length setting value b (a+b) as in the case of step S203.

In this exemplary embodiment, the post-conveyance amount calculator 37 changes the post-conveyance amount for the downstream side printer 10b based on the measured actual paper path length. However, it may be arranged such that the post-conveyance amount calculator 37 changes the post-conveyance amount for the upstream side printer 10a based on the measured actual paper path length. More particularly, the post-conveyance amount for the downstream side printer 10b is b and the post-conveyance amount for the upstream side printer 10a is an actual paper path length+b.

That is, the post-conveyance amount calculator 37 calculates the post-conveyance amounts for the printers 10a and 10b such that the difference between the post-conveyance amount for the printer 10a and the post-conveyance amount for the printer 10b corresponds to the measured actual paper path length.

Note that it may be arranged such that the previously-set paper path length setting value a or the actual paper path length can be selected as the paper path length between the printer 10a and the printer 10b.

Next, a particular operation of the print system according to the present exemplary embodiment will be described with reference to FIGS. 10A to 10F. Note that in the following description, the preconveyance amount is 160 inches, the paper path length setting value a is 400 inches, and the paper path length setting value b is 400 inches. When it is instructed to maintain a current length as the paper path length, the actual paper path length (actual paper path length) between the printer 10a and the printer 10b is 450 inches.

Figure 10A:
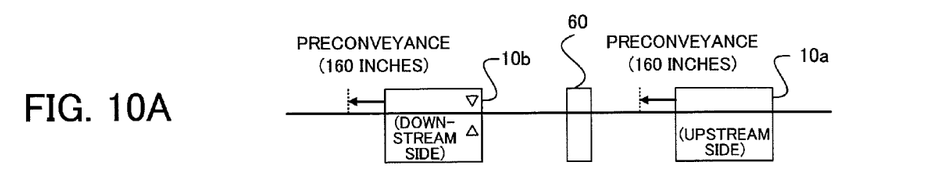
FIGS. 10A to 10F are explanatory diagrams of particular operations in the print system according to the exemplary embodiment of the present invention.
Figure 10B:
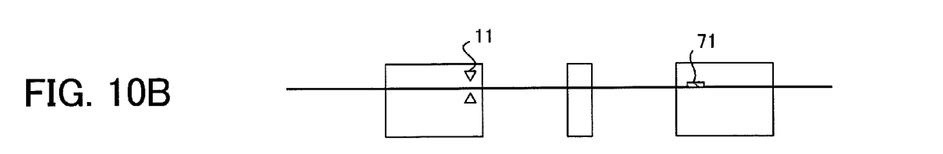
Figure 10C:
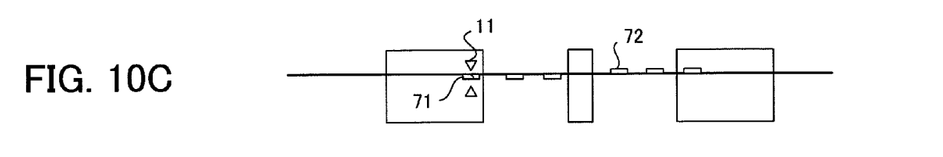

First, in the printers 10a and 10b, preconveyance by 160 inches is performed (FIG. 10A). Then, in the upstream side printer 10a, the head position detection mark 71 is printed (FIG. 10B). In the printer 10a, the head position detection mark 71 is printed and then the ROF mark 72 is printed on each page. In the downstream side printer 10b, the printed head position detection mark 71 is detected by the page position detector 11, and the actual paper path length of 450 inches is stored (FIG. 10C).

Figure 10D:
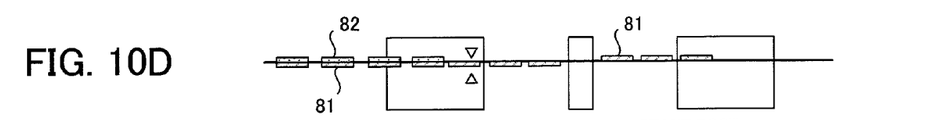

Then, when the adjustment printing has been completed and the actual printing is started, in the upstream side printer 10a, a front image 81 is printed, and in the downstream side printer 10b, a rear image 82 is sequentially printed on the continuous-form paper (FIG. 10D).

Figure 10E:
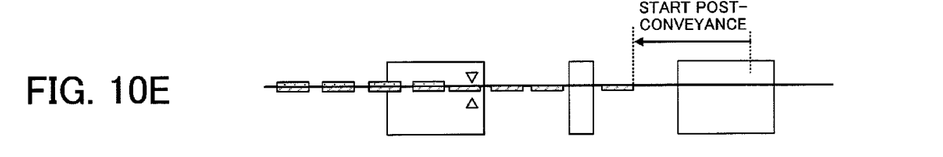

Then, in the upstream side printer 10a, when the actual printing has been completed, post-conveyance is started (FIG. 10E).

Note that the post-conveyance amount for the upstream side printer 10a is set to the sum of the paper path length setting value a and the paper path length setting value b, i.e., the value obtained with the following expression.

paper path length setting value $a$+paper path length setting value $b$=400+400=800(inches)

Further, the post-conveyance amount for the downstream side printer 10b is set to a length obtained by subtracting the difference between the measured actual paper path length and the paper path length setting value a from the paper path length setting value b, i.e., the value obtained with the following expression.

paper path length setting value $b$−(actual paper path length−paper path length setting value $a$)=400−(450−400)=350(inches)

Figure 10F:
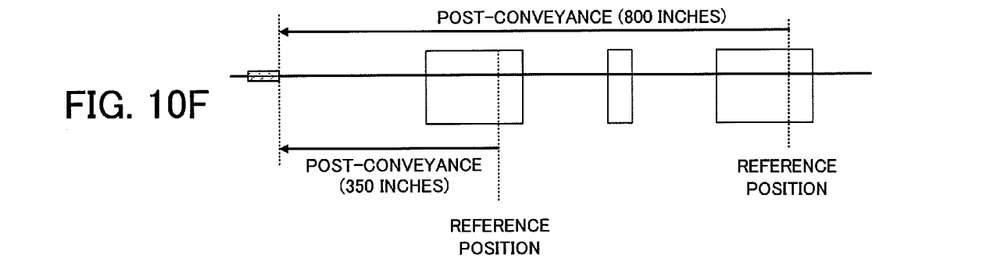

Then, in the downstream side printer 10b, when the actual printing has been completed, post-conveyance is started. Then, when the post-conveyance by distances set in the printers 10a and 10b has been completed, the paper path length between both printers is as shown in FIG. 10F. That is, the paper path length between the upstream side printer 10a and the downstream side printer 10b is the difference between the post-conveyance amount for the upstream side printer 10a and the post-conveyance amount for the downstream side printer 10b, i.e., 800−350=450 inches.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print system comprising:
   a first printer that performs printing on continuous-form paper;
   a second printer that performs printing on the continuous-form paper printed by the first printer based on a sensor in the second printer detecting a mark printed by the first printer;
   a measuring unit that measures a paper length between the first printer and the second printer;
   a calculator that calculates a post-conveyance amount as a distance to convey the continuous-form paper after the printing, for the first printer or the second printer, based on the paper length measured by the measuring unit; and
   a conveyance operation controller that controls post-conveyance operations in the first printer and the second printer based on the post-conveyance amount calculated by the calculator.

2. The print system according to claim 1, wherein when it is instructed by a setting unit to maintain a current length as the paper length between the first printer and the second printer, the calculator calculates the post-conveyance amounts for the first printer and the second printer so as to set a difference between the post-conveyance amount for the first printer and the post-conveyance amount for the second printer as the paper length measured by the measuring unit.

3. The print system according to claim 1, wherein the calculator obtains a sum of a first set value previously-set as the paper length between the first printer and the second printer and a second set value previously-set as the paper length between the second printer and a post processor, as the post-conveyance amount for the first printer, and obtains a length by subtracting a difference between the paper length measured by the measuring unit and the first set value from the second set value, as the post-conveyance amount for the second printer.

4. A print system comprising:
   a first printer that performs printing on continuous-form paper;
   a second printer that performs printing on the continuous-form paper printed by the first printer;
   a calculator that calculates a post-conveyance amount as a length to convey the continuous-form paper after the printing, for the first printer or the second printer; and
   a conveyance operation controller that controls post-conveyance operations in the first printer and the second printer based on the post-conveyance amount calculated by the calculator,
   the calculator obtaining a sum of a first set value previously-set as a paper length between the first printer and the second printer and a second set value previously-set as a paper length between the second printer and a post processor, as the post-conveyance amount for the first printer, and
   a setting unit configured to set the second set value as the post-conveyance amount for the second printer.

5. A print control apparatus comprising:
   a measuring unit that measures, based on a sensor in a second printer detecting a mark printed by a first printer, a paper length between the first printer to perform printing on continuous-form paper and the second printer to perform printing on the continuous-form paper printed by the first printer;
   a calculator that calculates a post-conveyance amount as a distance to convey the continuous-form paper after the printing, for the first printer or the second printer, based on the paper length measured by the measuring unit; and
   a conveyance operation controller that controls post-conveyance operations in the first printer and the second printer based on the post-conveyance amount calculated by the calculator.

6. A non-transitory computer readable medium containing a computer program causing a computer to execute a process for print control, the process comprising:
   measuring, based on a sensor in a second printer detecting a mark printed by a first printer, a paper length between the first printer to perform printing on continuous-form paper and the second printer to perform printing on the continuous-form paper printed by the first printer;
   calculating a post-conveyance amount as a distance to convey the continuous-form paper after the printing, for the first printer or the second printer, based on the measured paper length; and
   controlling post-conveyance operations in the first printer and the second printer based on the calculated post-conveyance amount.

* * * * *